(12) United States Patent
Smolinski

(10) Patent No.: US 11,131,427 B2
(45) Date of Patent: Sep. 28, 2021

(54) APPARATUS AND METHOD FOR HOLDING A PLURALITY OF ITEMS

(71) Applicant: Simple World Enterprises LLC, Shelbyville, KY (US)

(72) Inventor: Mike Smolinski, Shelbyville, KY (US)

(73) Assignee: Simple World Enterprises LLC, Shelbyville, KY (US)

( * ) Notice: Subject to any disclaimer, the term of this patent is extended or adjusted under 35 U.S.C. 154(b) by 78 days.

(21) Appl. No.: 15/339,770

(22) Filed: Oct. 31, 2016

(65) Prior Publication Data

US 2018/0119876 A1    May 3, 2018

(51) Int. Cl.
| | |
|---|---|
| *F16M 13/02* | (2006.01) |
| *F16M 11/40* | (2006.01) |
| *F16B 2/10* | (2006.01) |
| *F16B 1/00* | (2006.01) |

(52) U.S. Cl.
CPC .......... *F16M 13/022* (2013.01); *F16M 11/40* (2013.01); *F16B 2/10* (2013.01); *F16B 2001/0035* (2013.01)

(58) Field of Classification Search
CPC ...... F16M 13/022; H01R 24/60; H01R 33/92; H01R 2107/00; F16B 1/00; F16B 2/10; F16B 2001/0035
USPC ......... 269/45, 900, 75, 289 R, 296; 211/113, 211/118, 85.12, 30; 248/176.1, 309.1, 248/126, 128, 129, 205.1, 205.3, 309.4
See application file for complete search history.

(56) References Cited

U.S. PATENT DOCUMENTS

| | | | | |
|---|---|---|---|---|
| 1,956,518 | A | * | 4/1934 | Paulus ...................... B60R 1/06 248/205.1 |
| 1,996,552 | A | * | 4/1935 | Schwender .......... A47B 61/003 211/100 |
| 2,325,478 | A | * | 7/1943 | Collins .................... D06F 57/00 211/113 |
| 2,887,974 | A | * | 5/1959 | Weinfeld ........... H01R 43/0263 248/160 |
| 4,482,117 | A | * | 11/1984 | Besek, Jr. ............. A61J 9/0661 248/103 |
| 4,727,462 | A | * | 2/1988 | Komonko ........... F21V 21/0965 248/206.5 |

(Continued)

FOREIGN PATENT DOCUMENTS

EP           2387918 A1 * 11/2011 ............... A47F 5/08
JP        2017086558 A  *  5/2017

*Primary Examiner* — Kimberly T Wood
(74) *Attorney, Agent, or Firm* — John Bamert, Esq.; Mark P. Walters, Esq.; Lowe Graham Jones PLLC

(57) ABSTRACT

The invention includes an apparatus and method for holding a plurality of items. These methods and apparatuses have a base member including a plurality of receptacles, the receptacles configured to hold a flexible arm. The flexible arm including a distal and where the distal end has a holding element configured to hold any number of things. For example, the holding element could hold a display, a notepad, or some other item. In some embodiments, the holding element includes a clip. In other embodiments, the holding element is a USB plug or a computer display. The flexible arms can be made from a material which holds a shape. In this context, the flexible arm can be manipulated by the user to point the display in a particular direction or orientation.

20 Claims, 4 Drawing Sheets

(56) References Cited

U.S. PATENT DOCUMENTS

| | | | | |
|---|---|---|---|---|
| 4,885,667 A * | 12/1989 | Selden | | F21V 21/088 362/253 |
| 5,453,915 A * | 9/1995 | Bradley, III | | A45D 42/10 248/474 |
| 5,572,913 A * | 11/1996 | Nasiell | | B25B 13/481 81/177.6 |
| 5,842,670 A * | 12/1998 | Nigoghosian | | A45D 20/12 248/160 |
| 6,115,068 A * | 9/2000 | Ariga | | F16M 11/18 348/207.99 |
| 6,318,569 B1 * | 11/2001 | Rothing | | A47B 96/027 108/152 |
| 6,352,229 B1 * | 3/2002 | Adams | | A47G 1/17 24/67 R |
| 6,499,851 B1 * | 12/2002 | Kelly | | B60R 1/003 248/480 |
| 6,672,577 B2 * | 1/2004 | Murvine | | B25B 5/006 269/45 |
| 6,739,936 B1 * | 5/2004 | Cotilletta | | A63H 3/50 248/125.8 |
| 6,955,437 B1 * | 10/2005 | Roberts | | B60D 1/36 248/467 |
| 6,957,962 B2 * | 10/2005 | Tomino | | H01R 9/16 248/206.5 |
| D518,348 S * | 4/2006 | Fahey | | D8/71 |
| 7,140,922 B2 * | 11/2006 | Luu | | H01R 31/065 439/651 |
| 7,551,225 B2 * | 6/2009 | Overstreet | | F16M 11/041 248/187.1 |
| 7,568,670 B2 * | 8/2009 | Wang | | B60R 11/02 248/205.3 |
| 7,712,712 B2 * | 5/2010 | Richter | | B60R 11/02 248/161 |
| 8,107,243 B2 * | 1/2012 | Guccione | | G06F 1/26 330/285 |
| 8,449,318 B2 * | 5/2013 | Beller | | A61B 18/14 439/489 |
| 8,500,293 B2 * | 8/2013 | Sutton | | G03B 15/02 307/150 |
| 8,690,398 B2 * | 4/2014 | Restel | | F21V 21/088 362/152 |
| 9,642,480 B1 * | 5/2017 | Tanger | | A47G 1/17 |
| 2001/0040409 A1 * | 11/2001 | Jones | | H01R 13/514 307/36 |
| 2001/0048409 A1 * | 12/2001 | Kim | | F21V 21/32 345/82 |
| 2003/0020224 A1 * | 1/2003 | Murvine | | B25B 5/006 269/45 |
| 2004/0142601 A1 * | 7/2004 | Luu | | H01R 25/006 439/652 |
| 2004/0145676 A1 * | 7/2004 | Lin | | H04N 1/00204 348/374 |
| 2004/0221500 A1 * | 11/2004 | Schaak | | A47G 1/142 40/745 |
| 2004/0252505 A1 * | 12/2004 | Swanson | | F21S 6/008 362/257 |
| 2006/0028827 A1 * | 2/2006 | Lo | | B44C 5/005 362/382 |
| 2006/0036784 A1 * | 2/2006 | Loo | | H04N 1/00214 710/62 |
| 2006/0077286 A1 * | 4/2006 | Wenderski | | F16M 11/40 348/373 |
| 2006/0077672 A1 * | 4/2006 | Schaak | | F21S 6/003 362/418 |
| 2006/0191890 A1 * | 8/2006 | Agronin | | B23K 3/027 219/241 |
| 2006/0243685 A1 * | 11/2006 | Monroig | | A47K 1/09 211/65 |
| 2006/0250502 A1 * | 11/2006 | Tsao | | F41A 19/58 348/207.1 |
| 2006/0270909 A1 * | 11/2006 | Davis | | A61B 17/0218 600/210 |
| 2007/0030672 A1 * | 2/2007 | Offiler | | F21L 4/04 362/198 |
| 2007/0133156 A1 * | 6/2007 | Ligtenberg | | G06F 1/1616 361/679.27 |
| 2008/0010961 A1 * | 1/2008 | Gray | | A01D 46/30 56/10.2 A |
| 2008/0012423 A1 * | 1/2008 | Mimran | | H01R 25/003 307/11 |
| 2008/0120865 A1 * | 5/2008 | Smith | | F26B 25/18 34/239 |
| 2008/0158411 A1 * | 7/2008 | Firnberg | | F16M 11/10 348/373 |
| 2008/0248667 A1 * | 10/2008 | Sun | | H01R 13/7038 439/188 |
| 2010/0144164 A1 * | 6/2010 | Wang | | H01R 13/6205 439/39 |
| 2010/0288895 A1 * | 11/2010 | Shamie | | F16M 11/041 248/222.14 |
| 2012/0005868 A1 * | 1/2012 | Suderman | | F16B 7/0433 24/303 |
| 2012/0113645 A1 * | 5/2012 | Liao | | H02J 7/0042 362/253 |
| 2012/0120384 A1 * | 5/2012 | Barrett | | A61M 1/36 356/41 |
| 2012/0175474 A1 * | 7/2012 | Barnard | | F16M 11/041 248/122.1 |
| 2012/0274842 A1 * | 11/2012 | Cordes | | H04N 7/142 348/373 |
| 2013/0270002 A1 * | 10/2013 | Fawcett | | H01R 11/01 174/84 S |
| 2014/0009103 A1 * | 1/2014 | Nita | | H02J 7/355 320/101 |
| 2014/0016331 A1 * | 1/2014 | Ting | | F21V 33/0052 362/382 |
| 2014/0307439 A1 * | 10/2014 | Chien | | H02J 7/0042 362/253 |
| 2015/0076907 A1 * | 3/2015 | Roh | | H01R 13/7036 307/38 |
| 2016/0120303 A1 * | 5/2016 | Constantino | | F16M 11/42 108/28 |
| 2016/0167853 A1 * | 6/2016 | Gallup | | A47G 29/10 248/205.2 |
| 2016/0199716 A1 * | 7/2016 | Nergaard | | A63B 69/002 473/446 |
| 2016/0327202 A1 * | 11/2016 | Hoeltge | | F16M 11/40 |
| 2017/0159929 A1 * | 6/2017 | Li | | F21V 33/0024 |

\* cited by examiner

APPARATUS AND METHOD FOR HOLDING A PLURALITY OF ITEMS

FIELD OF THE INVENTION

The invention relates generally to housewares, office supplies, and convenience items and specifically to items usable around the home, office, and elsewhere where a need exists to aid a person's organization, storage, or display.

BACKGROUND OF THE INVENTION

Homeowners, renters, and office occupants alike need common-sense ways in which to hold a variety of items. Moreover, these people need ways in which to organize a plurality of items which might be usable in various ways and for various, perhaps unrelated, purposes. For example, a busy parent may have a plurality of appointments scheduled for the week and may wish to remind him or herself of each appointment. Additionally, a busy parent may have the need to arrange and organize a plurality of other items in a three-dimensional space where the items can be seen in a logical order and priority.

An office worker may have a plurality of engagements or may have a plurality of devices that he or she needs to look at and see arranged in a number of different sequences and orders. In particular, an office worker may need to see a variety of notes or displays arranged in a particular way in three-dimensional space such that the items on display can be usable by the office worker in an optimal way.

Still other people require aesthetically pleasing arrangements that can be changed over time to suit the constantly changing desires for a visual display. For example, a plurality of items for display can be connected to a surface at a location of common use whereby visitors may see the visual display and react to it appropriately. One common example of this is the refrigerator surface and the many magnets that can be placed on such a surface. One of ordinary skill in the art is familiar with the use of refrigerator magnets to secure a plurality of visually pleasing artwork. Sometimes this can be artwork provided by the user's children, nieces, nephews, or others. Sometimes the refrigerator magnets can secure notes to remind the user to go shopping, to pick up certain items, or to not forget to do one thing or another thing.

In many households, the refrigerator has become a key hub for communication. Busy parents use the refrigerator to leave messages of various content to their children and to each other. Shopping lists are commonly placed on such a surface, and other items such as postcards or even kitschy, touristy, tchotchkes that might invoke a memory of good times or serve as an important talking point during a party or family gathering. Above all, the refrigerator is a place including an ever-changing panoply of information and display.

There exists a need to provide a way in which a user can efficiently organize and prioritize various items and hold them out for display in a logical, flexible order. Additionally, there exists a need in which a user can hold various items for display or use and manipulate the order in sequence in which those items are seen, stored, or used in three-dimensional space.

SUMMARY OF THE INVENTION

An apparatus for holding a plurality of items is provided, where the apparatus comprises a base member, the base member including a plurality of receptacles, each receptacle configured to removably secure a flexible arm, the flexible arm having a first and a second end, the first end configured to removably attach to the base member and the second end configured to removably attach to at least one holding element.

A method of holding elements for display is also provided, the method comprises the steps of (a) providing a base member, the base member including a plurality of receptacles, each receptacle configured to removably secure a flexible arm; (b) providing a flexible arm, the flexible arm having a first and a second end, the first end configured to removably attach to the base member and the second end configured to removably attach to at least one holding element; and (c) providing a holding element, the holding element configured to display and item.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
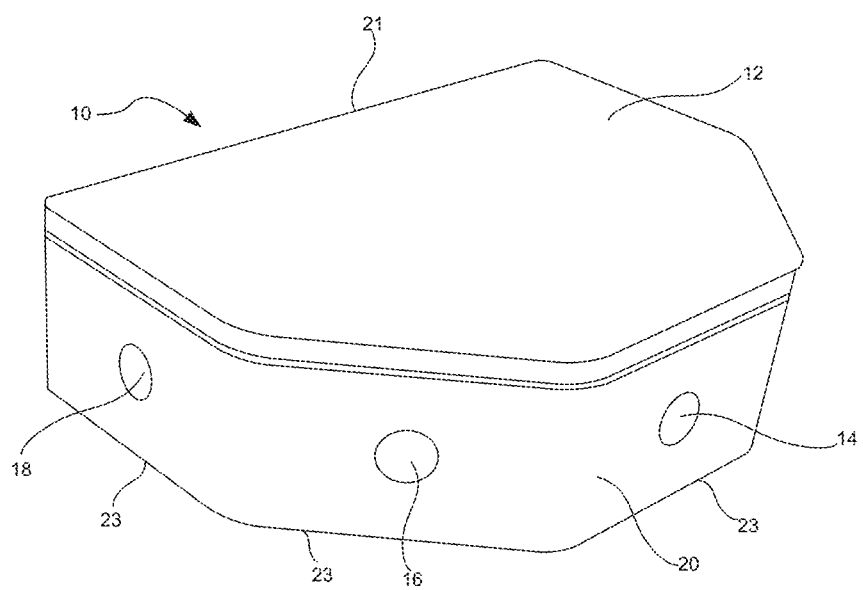
FIG. 1 is a top perspective view of a base member showing receptacle made in accordance with principles of the invention.

FIG. 1 shows a base member 10 usable in accordance with the present invention. Base member 10 lies flat on a surface however the orientation of the base member is unimportant and can be varied and still be within the scope of the invention. As depicted in FIG. 1 however, the base member is lying on horizontal surface and includes various sides 20. The various sides 20 are joined together to form a block-like arrangement rising vertically from the horizontal surface. Base member 10 includes a lid 12. The lid 12 serves as a display surface. As depicted, base member 10 includes display surface 12 which can ornamental in appearance or otherwise configured to display a variety of messages. Surface 12 is removable from the base member, however, the base member may be also constructed from a single piece of material. The lid may be removably attached to base member 10 or sonic welded thereto.

As depicted, base member 10 is constructed from injection molded ABS plastic. This is a common injection molded plastic familiar to one of ordinary skill in the art. It is important to note that the type of plastic or the type of material used to construct base member 10 is unimportant and non-limiting to the scope of the present invention. Optionally, base member 10 may be constructed from injection molded plastic and also include a silicone rubber coating to provide an optimal tactile experience for the user.

Additionally, the base member may be constructed from metal which can be magnetized or electro-magnetized. Additionally, the base member may contain a variety of niches, holes, recessed areas, and other holding spaces to hold coins, paperclips, sticky notes, salt-and-pepper shakers, staples, and a variety of other devices one might find the need to access on an instantaneous or semi-instantaneous basis.

The particular shape of the base member 10 can vary. As shown in this embodiment, there is a long edge 21 and a series of shorter edges 23. Long edge 21 is about twice the size of shorter edges 23. The side of the base member depicted rises about 1 inch in height from the horizontal surface upon which base member 10 sits. The display surface 12 is approximately 1.5 square-inches to 4 square-inches. The relative size of display surface 12 is larger than the side surfaces 20. This enables a larger area for display at display surface 12.

Base member 10 as depicted in FIG. 1 includes receptacles 18, 16, 20, and these receptacles are configured to hold any number of items or flexible arms (not shown). Receptacles 18, 16, 20, and 14 may include means for connecting flexible arms including an inner-bore configured to receive threads. The receptacles may include an inside diameter of approximately 1 to 4 mm.

Figure 2:
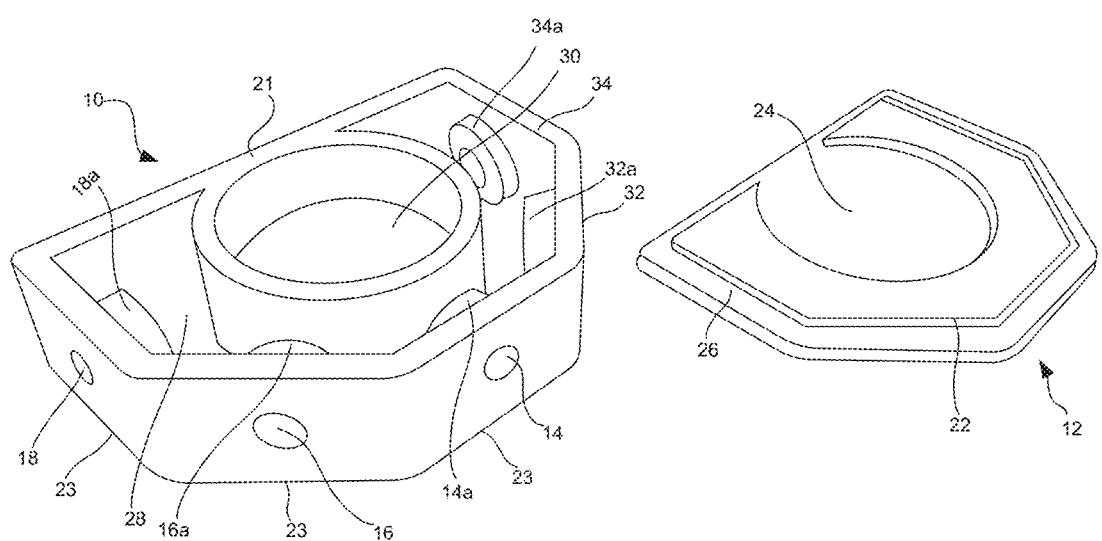
FIG. 2 is a top perspective view of a base member useable in accordance with principles of the invention, with the lid portion of the base member removed, exposing an internal area of the base member.

As shown in FIG. 2, base member 10 is depicted with the lid 12 removed and placed horizontally on a surface. As shown, lid 12 includes a raised area 22 forming an edge parallel to edges 23 and back edge 21. The edge 22 is slightly raised from a surface 26 which encompasses the entire edge of the lid and permits the lid to securely attach to the top of the base member 10.

Base member 10 includes a void 30. Void 30 is configured to receive attachment means such as, for example, one or more magnet. Receptacles 18, 16, 14, 32 and, 34 include inner portions respectively, 18a, 16a, 14a, 32a, and 34a. Inner portions 18a, 16a, 14a, 32a, and 34a have a thickness permitting secure attachment of flexible arms (not shown). For example, inner portions 18a, 16a, 14a, 32a, and 34a are fortified with enough material to support predetermined shear, tensile, and compressive forces that might be caused by the connection of flexible arms (not shown). Moreover, inner portions 18a, 16a, 14a, 32a, and 34a are configured to receive a threaded bore of sufficient pitch and depth to support a predetermined tensile and compressive stress.

As depicted, base member 10 includes a circular void 30. As previously mentioned void 30 is configured to receive attachment means such as, for example, a magnet. It is contemplated, however, within the scope of the invention, that void 30 can be of any shape and can include any form of attachment means including screws or nails, or receptacles permitting removable attachment onto screws or nails, Velcro®, or some other common means of attaching one thing to another.

As depicted, base member 10 includes an internal region 28. Internal region 28 can include any number of things usable in accordance with the invention. For example internal region 28 can include power 73 such as batteries; it may include a central processing unit, a printed circuit board, video or display cards, or any number of electronic devices. Furthermore, internal region 28 may simply be used for convenient storage within the base member 10. For example, lid 12 may be removed to expose internal region 28 which, in turn, would provide access to storage within base member 10. It should be mentioned, that lid 12 may be removably attached to base member 10 through a variety of means including magnetic means. Furthermore, lid 12 may be removably attached to base member 10 by Velcro, snaps, or it may be integrally formed in a single piece of material forming base member 10.

Internal region 28 may include communication means such as a receiver or antenna configured to receive signals from a remote location or from a mobile device. In this sense, the base member may be able to send signals through receptacles 18, 16, 14, 32 and, 34 through flexible arms (not shown). And vice versa, flexible arms may be able to receive and send signals to an antenna or receiver located within internal region 28.

Figure 3:
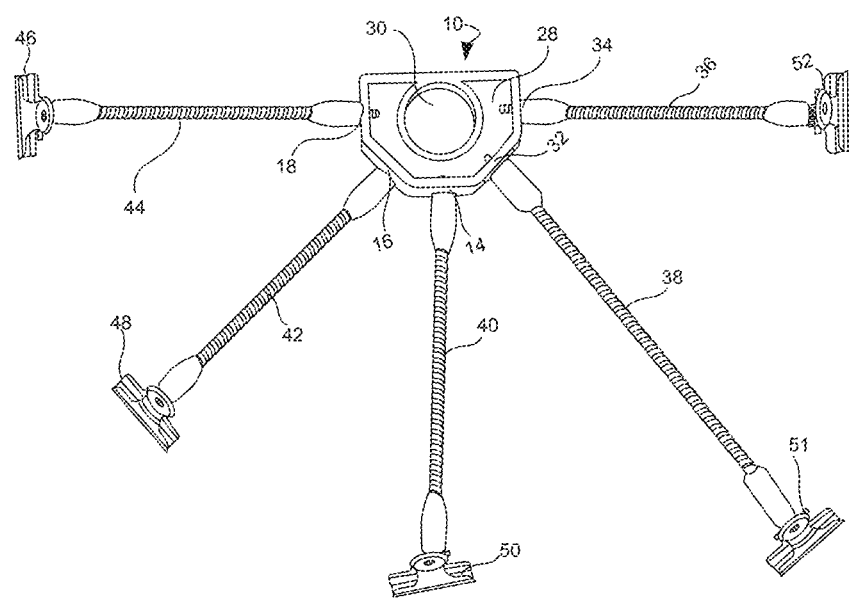
FIG. 3 is a top view of a base member usable in accordance with principals of the invention showing flexible arms and holding elements usable in accordance with principles of the present invention.

FIG. 3 shows base member 10 with flexible arms 44, 42, 40, 38 and 36 attached thereto. Preferably, flexible arms 44, two, 40, 38, and 36 are removably attached to base 10 at receptacles 18, 16, 14, 32, and 34. Internal region 28 is shown to provide a space within which to provide various materials and things including a central processing unit, power 73 (such as batteries), and any number of things. At the distal end of each flexible arm, a holding element is attached. For example, as seen in FIG. 3, the apparatus embodiment includes holding elements 46, 48, 50, 51, and 52.

One of ordinary skill in the art will appreciate that holding elements 46, 48, 50, 51, and 52 can be any variety of things sufficient to hold another item. As depicted, these holding elements are clips. One of ordinary skill in the art will appreciate however that the invention is not limited to holding elements comprised of clips. For example, the holding elements 46, 48, 50, 51, and 52, May be any number of things sufficient to hold another thing such as a magnet, a metal surface configured to receive a magnet, a USB plug 72, cups, containers, and other notched surfaces sufficient to hold an item. For example, holding elements 46, 48, 50, 51, and 52 may include rubberized surfaces that can hold an item thereupon such that friction forces keep the item from falling to the ground.

Flexible arms 44, 42, 40, 38, and 36 are optionally made from stainless steel, carbide steel, or aluminum. Preferably, the flexible arms are of a conduit gooseneck style (also known as quote "stay-put" conduit). The diameter of the arms depicted is anywhere from 1 mm to 4 mm. The inside of each flexible arm can include communication means including a USB wire providing data signals through each flexible arm as well as power.

The ends of flexible arms 44, 42, 40, 38, and 36 may include electronic displays 76 that respond to a signal to display. The signal may be sent from a remote source, from a mobile device, or from within internal area 28. These mini displays 76 may provide any number of aesthetically pleasing designs or may be used to display information.

Alternatively, flexible arms 44, 42, 30, 38, and 36 may include display surfaces 75 such as notepads or erasable whiteboards. The apparatus in the depicted embodiment may include any number of flexible arms. The flexible arms shown here number five. Having five arms allows a user to utilize each arm for a particular day of the work-week. For example: Monday, Tuesday, Wednesday, Thursday, and Friday may have dedicated arms in accordance with the present invention. A user may manipulate the position of each arm to suit a particular purpose and to arrange particular items in an order. For example, a user may put the items straight out, radially from the center of base member 10 as shown, or the user may move the arms to a position outward relative to the base member 10. Moreover, the flexible arms may be manipulated at various degrees relative to one another and relative to base member 10.

Flexible arms 44, 42, 36, 40 and 38 need not be made from hollow material. They can be made from a solid flexible material that holds its shape. Additionally, flexible arms 44, 42, 36, 40 and 38 may be made from a material that does not hold its shape but rather, simply hangs from base member 10 or otherwise is loosely attached to base member 10.

Base member 10 may be used to removably attach things other than flexible arms. For example, pre-made items such as novelty items and decorative items can be interchangeably inserted into base member 10 to suit the user's interest. Additional items may be connected to base member 10 by way of a proprietary insert, such as an insert of a particular shape and size, manufactured to fit in a compatible receptacle. In this way, a particular provider or style of decorative item can be inserted into base member 10 and the user may collect many other compatible items to insert into base member 10. Any number of items can be removably attached into base member 10 including flags, fans, symbols, maps, notices, sayings, mirrors, LED lights, mobile-device mounts 74, charging receptacles, and any number of other items may be inserted in the base member 10 thereby permitting the items to be readily accessible and visible to the user.

Figure 4:
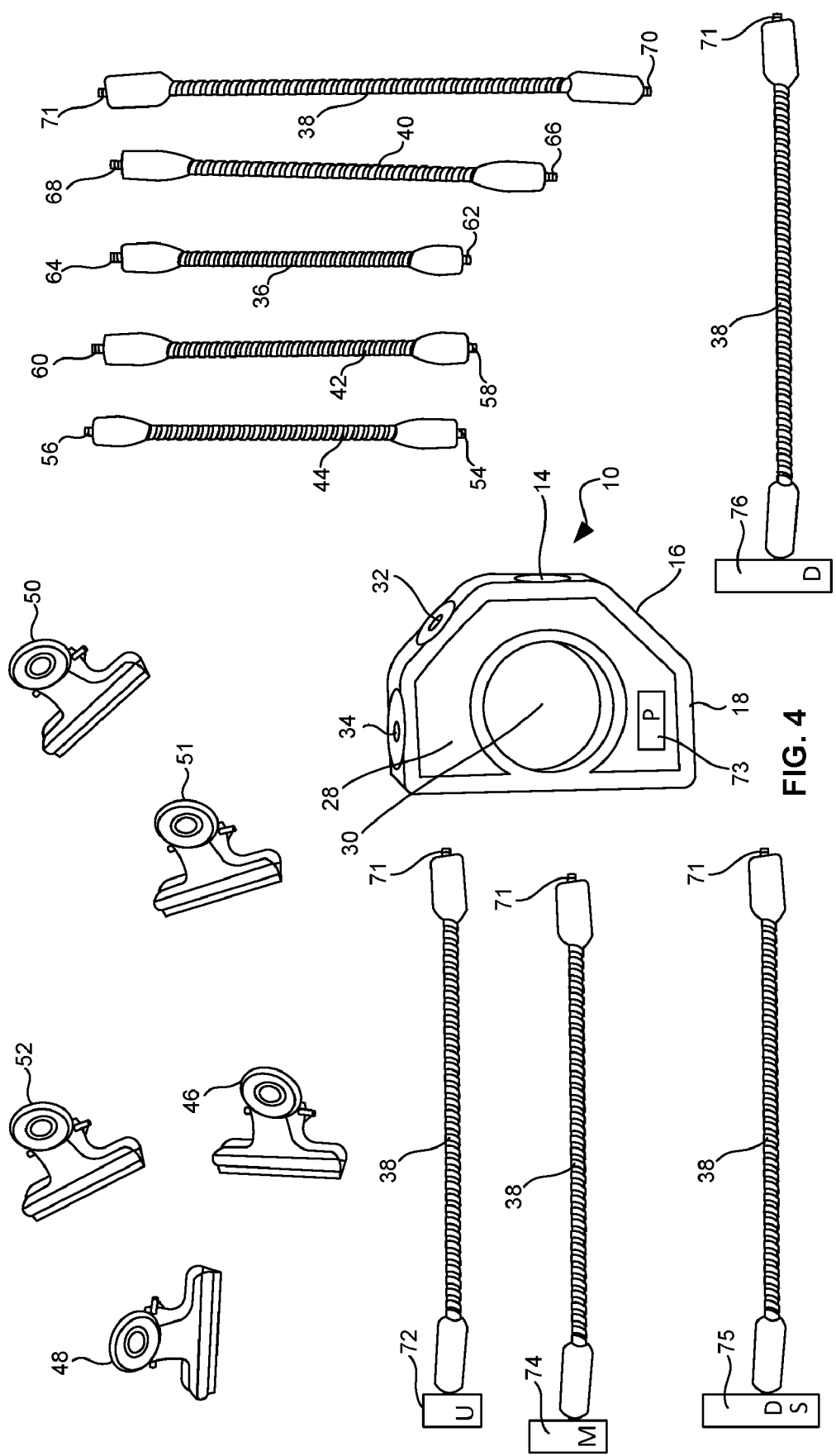
FIG. 4 shows a base member usable in accordance with principles of the present invention as well as several flexible arms usable in accordance with principles of the present invention as well as several holding elements usable in accordance with principles of the present invention.

FIG. 4 shows various parts of the depicted embodiment, including flexible arms 44, 42, 36, 40, and 38. As shown in this particular embodiment each side of each flexible arm includes a threaded portion, 54 and 56, 58 and 60, 62 and 64, 66 and 68, and 70 and 71. The preferred embodiment includes means for removably attaching each flexible arm to base member 10 at receptacles 18, 16, 14, 32, and 34. The flexible arms need not be removably attached to base member 10 in order to be usable in accordance with the present invention. The flexible arms as depicted in FIG. 4 are meant to attach with holding elements, 48, 46, 52, 51, and 50 respectively as an alternative to holding elements 48, 46, 52, 51, and 50, various display surfaces 75 may be attached to the distal end of each flexible arm. Various display elements 75 can include notepads for the recording of a note by the user.

The holding elements of the depicted embodiment may be swapped for any number of items including different styles of holding elements or clips, small pencil holder cups, small mirrors, LED lights, cell phone holders or mounting devices 74, or other USB powered devices such as a fan, a date-and-time display, or other displays powered by a USB device. Moreover, the holding elements 48, 46, 52, 51, and 50 need not be clips and can be color-coded to suit a user's need. For example a certain color may be used for urgent notices or displays while another color may be used for notices of less urgency.

One of ordinary skill will appreciate that any sort of magnet or magnets may be usable in accordance with the present invention. The depicted embodiment is made to be used with a neodymium grade N42 magnet having a diameter of ½ inch and a thickness of ¼ inch. In the depicted embodiment, the magnet is meant to extend slightly away from the under-surface of base member 10 such that the under-surface of base member 10 does not come into contact with the metal surface upon which the magnet is connected. Alternatively, the magnet may be inserted within base member 10 creating a flush or even surface equal to the rear surface of the base member such that both the connecting surface of the magnet and the under-surface of the base member are in the same plane and both are in contact with the contacting surface such as, for example, a refrigerator surface.

An alternative embodiment of the invention includes an enlarged version of the base member 10 constructed preferably from metal whereby the flexible arms are constructed from gooseneck conduit that will be permitted to hold up to 10 or 15 pounds in a horizontal position. For example the base member may be suspended from the ceiling or otherwise connected or fastened to a wall stud or other type of structural piece of a garage environment within which to hold base member 10. In this alternative embodiment usable with a garage, the holding surfaces will include very large clips or buckets or some other form of container that is logically used in a garage for storing items such as hand tools, power tools, garden tools, hardware, sporting goods, and any number of other items commonly found in a garage.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for holding a plurality of items, the apparatus comprising a base member, the base member including a plurality of receptacles, each receptacle configured to secure a flexible arm, the flexible arm having a first and a second end, the first end configured to attach to the base member and the second end configured to attach to at least one holding element, the base member having a rear face, a front face that is parallel to the rear face, one or more peripheral side walls that extend from the rear face to the front face, and a void that is positioned between two or more portions of the one or more peripheral side walls and spaced apart from the one or more peripheral side walls, the void has a longitudinal axis that extends perpendicular to the rear face, the void is configured to receive one or more attachment mechanisms that secure the base member to a vertical surface with the rear face parallel to the vertical surface, each of the plurality of receptacles is disposed in the one or more peripheral side walls, and each of the at least one holding element holding an object by supporting an entirety of a weight of the object.

2. The apparatus of claim 1 wherein the holding element is a clip.

3. The apparatus of claim 1 wherein the void is configured to hold a magnet.

4. The apparatus of claim 1 wherein each of the plurality of receptacles includes a threaded bore.

5. The apparatus of claim 1 wherein the flexible arm is configured to hold a shape.

6. The apparatus of claim 1 wherein the flexible arm includes a USB cord.

7. The apparatus of claim 1 wherein the holding element is a USB plug.

8. The apparatus of claim 1 wherein the base member includes a power source.

9. The apparatus of claim 1 wherein the holding element includes a mount for a mobile device.

10. An apparatus for holding a plurality of items, the apparatus comprising a base member, the base member including a plurality of receptacles, each receptacle configured to secure a flexible arm, the flexible arm having a first and a second end, the first end configured to attach to the base member and the second end configured to attach to at least one displaying surface, the base member having a rear face, a front face that is parallel to the rear face, one or more peripheral side walls that extend from the rear face to the front face, and a void that is positioned between two or more portions of the one or more peripheral sidewalls and spaced apart from the one or more peripheral side walls, the void has a longitudinal axis that extends perpendicular to the rear face the void is configured to receive one or more attachment mechanisms that secure the base member to a vertical surface with the rear face parallel to the vertical surface, each of the plurality of receptacles is disposed in the one or more peripheral side walls, and each of the at least one holding element holding an object by supporting an entirety of a weight of the object.

11. The apparatus of claim 10 wherein the displaying surface is a note pad.

12. The apparatus of claim 10 wherein the void is configured to hold a magnet.

13. The apparatus of claim 10 wherein the flexible arm is configured to hold a shape.

14. The apparatus of claim 10 wherein the displaying surface is a computer screen.

15. A method of holding elements for display, the method comprising the steps of:
  a. providing a base member, the base member including a plurality of receptacles, each receptacle configured to secure a flexible arm, the base member having a rear face, a front face that is parallel to the rear face, one or more peripheral side walls that extend from the rear face to the front face, and a void that is positioned between two or more portions of the one or more peripheral side walls and spaced apart from the one or more peripheral side walls, the void has a longitudinal axis that extends perpendicular to the rear face, and each of the plurality of receptacles is disposed in the one or more peripheral side walls;
  b. positioning an attachment mechanism in the void;
  c. covering the attachment mechanism in the void with the front face of the base member;
  d. employing the attachment mechanism positioned in the void to secure the base member to a vertical surface with the rear face parallel to the vertical surface;
  e. providing a flexible arm, the flexible arm having a first and a second end, the first end configured to attach to the base member and the second end configured to attach to at least one holding element; and
  f. providing a holding element, the holding element configured to display an item and attach to the flexible arm, the holding element holding the item by supporting an entirety of a weight of the item.

16. The method of claim 15, wherein the flexible arm is configured to hold a shape.

17. The method of claim 15, wherein the holding element is a clip.

18. The method of claim 15, wherein the flexible arm includes a USB cord.

19. The apparatus of claim 1, wherein the flexible arm hangs from the base member and does not hold a shape of the flexible arm.

20. The method of claim 15, wherein the flexible arm hangs from the base member and does not hold a shape of the flexible arm.

* * * * *